United States Patent
Bodapati et al.

(10) Patent No.: US 12,250,180 B1
(45) Date of Patent: Mar. 11, 2025

(54) DYNAMICALLY SELECTABLE AUTOMATED SPEECH RECOGNITION USING A CUSTOM VOCABULARY

(71) Applicant: Amazon Technologies, Inc., Seattle, WA (US)

(72) Inventors: Sravan Babu Bodapati, Redmond, WA (US); Ashish Vishwanath Shenoy, Seattle, WA (US); Monica Lakshmi Sunkara, Sunnyvale, CA (US); Katrin Kirchhoff, Seattle, WA (US); Anubhav Mishra, Seattle, WA (US); Harshal Pimpalkhute, Redmond, WA (US); John Baker, Bellevue, WA (US); Ganesh Kumar Gella, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 734 days.

(21) Appl. No.: 17/393,124

(22) Filed: Aug. 3, 2021

(51) Int. Cl.
*H04L 51/02* (2022.01)
*G10L 15/197* (2013.01)
*G10L 15/22* (2006.01)

(52) U.S. Cl.
CPC ............ *H04L 51/02* (2013.01); *G10L 15/197* (2013.01); *G10L 15/22* (2013.01)

(58) Field of Classification Search
CPC ........ H04L 51/02; G10L 15/197; G10L 15/22
USPC ....................................................... 704/231
See application file for complete search history.

(56) References Cited

U.S. PATENT DOCUMENTS

| | | | |
|---|---|---|---|
| 6,334,102 B1 * | 12/2001 | Lewis | G10L 15/197 704/255 |
| 6,345,249 B1 * | 2/2002 | Ortega | G10L 15/197 704/255 |
| 7,328,158 B1 * | 2/2008 | Burridge | G10L 15/183 704/E15.044 |
| 8,352,246 B1 * | 1/2013 | Lloyd | G10L 25/12 704/9 |
| 8,700,392 B1 * | 4/2014 | Hart | G10L 15/25 704/231 |
| 11,232,645 B1 * | 1/2022 | Roche | G06V 20/20 |
| 11,361,764 B1 * | 6/2022 | Zhao | G06F 40/30 |
| 11,373,645 B1 * | 6/2022 | Mathew | G10L 15/1815 |
| 11,640,767 B1 * | 5/2023 | Bridges | G09B 19/00 434/257 |
| 11,756,538 B1 * | 9/2023 | Dell | G10L 15/02 704/232 |

(Continued)

*Primary Examiner* — Thuykhanh Le
(74) *Attorney, Agent, or Firm* — Nicholson De Vos Webster & Elliott LLP

(57) ABSTRACT

Techniques for at least the generation of a chatbot built from a custom vocabulary and to use runtime hints during inference are described. In some examples, the generation of the chatbot includes receiving a request to build a chatbot using a bot definition and a custom vocabulary, wherein the chatbot is to use runtime hints during usage; building the chatbot from the bot definition and custom vocabulary by at least: generating automatic speech recognition (ASR) artifacts to be used in decoding audio input into the chatbot into text for at least one other component of the chatbot to use in determining a next act to be performed, the ASR artifacts including artifacts that use the custom vocabulary and artifacts that do not use the custom vocabulary, and storing the ASR artifacts.

20 Claims, 13 Drawing Sheets

(56) References Cited

U.S. PATENT DOCUMENTS

| | | | | |
|---|---|---|---|---|
| 11,783,807 B2* | 10/2023 | Kwatra | ............... | G06N 3/045 704/232 |
| 2002/0138265 A1* | 9/2002 | Stevens | ............... | G10L 15/22 704/E15.04 |
| 2004/0030543 A1* | 2/2004 | Kida | ............... | G06F 40/274 704/8 |
| 2005/0198023 A1* | 9/2005 | James | ............... | G06F 3/0236 |
| 2007/0288241 A1* | 12/2007 | Cross | ............... | G10L 15/06 704/E15.04 |
| 2007/0294084 A1* | 12/2007 | Cross | ............... | G10L 15/22 704/E15.044 |
| 2009/0019002 A1* | 1/2009 | Boulis | ............... | G06F 9/451 |
| 2010/0114887 A1* | 5/2010 | Conway | ............... | G06F 3/0237 707/E17.014 |
| 2010/0125569 A1* | 5/2010 | Nair | ............... | G06Q 30/02 707/E17.055 |
| 2010/0185438 A1* | 7/2010 | De La Cruz | ............... | G06F 40/242 704/10 |
| 2012/0053935 A1* | 3/2012 | Malegaonkar | ............... | H04M 3/56 704/235 |
| 2012/0185240 A1* | 7/2012 | Goller | ............... | G10L 15/22 704/201 |
| 2012/0331064 A1* | 12/2012 | Deeter | ............... | G06Q 10/10 709/204 |
| 2013/0085747 A1* | 4/2013 | Li | ............... | G06F 40/242 704/10 |
| 2013/0158987 A1* | 6/2013 | Xing | ............... | G06F 40/274 704/E11.001 |
| 2013/0211825 A1* | 8/2013 | Tseng | ............... | G06F 40/242 704/10 |
| 2015/0100240 A1* | 4/2015 | Toopran | ............... | G01C 21/3679 704/270.1 |
| 2015/0170643 A1* | 6/2015 | Nicholson | ............... | G06F 21/32 704/254 |
| 2015/0269930 A1* | 9/2015 | Chien | ............... | G10L 15/22 704/251 |
| 2015/0310855 A1* | 10/2015 | Bak | ............... | G10L 15/22 704/249 |
| 2015/0348547 A1* | 12/2015 | Paulik | ............... | G10L 15/197 704/251 |
| 2017/0069311 A1* | 3/2017 | Grost | ............... | G10L 15/26 |
| 2018/0011842 A1* | 1/2018 | Waibel | ............... | G10L 13/00 |
| 2018/0293977 A1* | 10/2018 | Liensberger | ............... | G10L 15/183 |
| 2018/0330717 A1* | 11/2018 | Jin | ............... | G10L 15/12 |
| 2019/0102379 A1* | 4/2019 | First | ............... | G06F 9/44505 |
| 2019/0279618 A1* | 9/2019 | Yadav | ............... | G06F 40/30 |
| 2019/0311720 A1* | 10/2019 | Pasko | ............... | G06F 3/167 |
| 2019/0333020 A1* | 10/2019 | Zhao | ............... | G06Q 10/107 |
| 2020/0005774 A1* | 1/2020 | Yun | ............... | G10L 15/183 |
| 2020/0005789 A1* | 1/2020 | Chae | ............... | G10L 15/22 |
| 2020/0035235 A1* | 1/2020 | Lee | ............... | G10L 15/30 |
| 2020/0175982 A1* | 6/2020 | Nakamura | ............... | G06F 3/167 |
| 2020/0357412 A1* | 11/2020 | Robert Jose | ............... | G10L 15/1815 |
| 2020/0365155 A1* | 11/2020 | Milden | ............... | G06F 3/167 |
| 2021/0043212 A1* | 2/2021 | Gruenstein | ............... | G10L 15/32 |
| 2021/0118449 A1* | 4/2021 | Kim | ............... | G10L 15/16 |
| 2021/0264916 A1* | 8/2021 | Kim | ............... | G10L 15/22 |
| 2021/0295833 A1* | 9/2021 | Rastrow | ............... | G10L 15/1815 |
| 2021/0349888 A1* | 11/2021 | Barta | ............... | G06F 16/9535 |
| 2021/0406473 A1* | 12/2021 | Park | ............... | H04L 51/02 |
| 2022/0058347 A1* | 2/2022 | Singaraju | ............... | G06F 40/40 |
| 2022/0130380 A1* | 4/2022 | Touati | ............... | G06Q 10/107 |
| 2022/0200935 A1* | 6/2022 | Srivastava | ............... | G06F 9/44505 |
| 2022/0237567 A1* | 7/2022 | Tiwari | ............... | G06Q 10/1053 |
| 2022/0244925 A1* | 8/2022 | Moss | ............... | G10L 15/183 |
| 2022/0366147 A1* | 11/2022 | Ho | ............... | G06F 40/35 |
| 2022/0383879 A1* | 12/2022 | Agarwal | ............... | G10L 17/04 |
| 2022/0394454 A1* | 12/2022 | Jiang | ............... | H04W 8/005 |
| 2023/0071845 A1* | 3/2023 | Ould Dellahy | ............... | H04N 21/8545 |

* cited by examiner

```
BOT DEFINITION
      401

INTENT: PLAN TRIP [
      SAMPLE UTTERANCES FOR INTENT:
            "I WOULD LIKE TO PLAN A TRIP"
            "I WANT TO GO ON VACATION"
      "SLOTS": [
            "SLOTTYPE" : CUSTOM OR PRE-BUILT
            "NAME": NAME OF SLOT
            "SLOTCONSTRAINT": CONSTRAINT
            ...
            "SAMPLEUTTERANCES": [
                  "TEXT"
                  ]
            ]

]
 ...
```

```
CUSTOM VOCAB DEFINITION
        403

"GLOBAL" :{
            "CUSTOM_VOCAB": ["ABC1", "XYZ2, ... ]
      "SLOTNAME" :{
            "CUSTOM_VOCAB": ["SLOT_ENTITY1", "SLOT_ENTITY2, ... ]
```

*FIG. 4*

BOTS > DRAFT VERSION > ... > CUSTOM VOCABULARY ENGLISH

BOTS

BOT VERSIONS
  DRAFT VERSION
    LANGUAGES
    ▶ ENGLISH
      INTENTS
      SLOT TYPES
    SPANISH

DEPLOYMENT
ANALYTICS

CUSTOM VOCABULARY: ENGLISH

CUSTOM VOCABULARY

FILTER 1001

VIEW 1003
| TABLE | PLAIN TEXT |

PHRASE OR WORD 1005    SOUNDS LIKE 1007    PRONUNCIATION 1007    DISPLAY AS 1009    WEIGHT 1011    X

ADD PHRASE OR WORD 1013      SAVE 1015

*FIG. 10*

DYNAMICALLY SELECTABLE AUTOMATED SPEECH RECOGNITION USING A CUSTOM VOCABULARY

BACKGROUND

Many users interact with chatbots using voice prompts. Some chatbots interact by detecting the intent of the user from the voice prompt response and then asking specific questions for fulfilling that intent (which can then be answered via voice).

BRIEF DESCRIPTION OF DRAWINGS

Various embodiments in accordance with the present disclosure will be described with reference to the drawings, in which:

FIG. 4 illustrates an embodiment of a part of an exemplary bot definition and custom vocabulary definition.

FIG. 10 illustrates embodiments of a graphical user interface for editing a custom vocabulary.

DETAILED DESCRIPTION

The present disclosure relates to methods, apparatus, systems, and non-transitory computer-readable storage media for using a custom vocabulary in performing automatic speech recognition (ASR) especially in a context of a chatbot (or bot).

Some models optimize for the likelihood of the word occurring in the ASR transcripts. In a few cases, user would expect few words to only be recognized with high probability when there is request to for a slot. For example, but for all other intent and generic utterances, this would not be a custom word expected with high probability. For example, an uncommon phrase would be unlikely to be found with high probability. To better handle that uncommon phrase, detailed herein are embodiments of a user facing feature for a custom vocabulary that may have varying scopes of recognition (global or slot) of a custom word based on one or more of runtime hints input from the customer, user metadata, intent/slot type, and/or other data sources. The custom vocabulary is a list of specific words to recognize in audio input. These are generally domain-specific words and phrases or proper nouns that are not recognized very well by default. A custom vocabulary may be uploaded using an application programming interface (API) (e.g., using location that stores a custom vocabulary, providing the custom vocabulary with API request, etc.) or console (e.g., allowing for the point to a location storing a custom vocabulary, allowing for input of custom vocabulary phrases, etc.). A custom vocabulary can be used to increase improve the transcriptions of words or phrases that is unique to specific use-cases or domain handled by the bot. For example, in a healthcare bot, custom vocabulary can be used to boost the transcription accuracy of phrases such as "COVID", while allowing to decrease the occurrence of similar sounding words such as "covered." In some embodiments, custom vocabulary usage is unique to a locale and each locale has an independent custom vocabulary setting.

Figure 1:
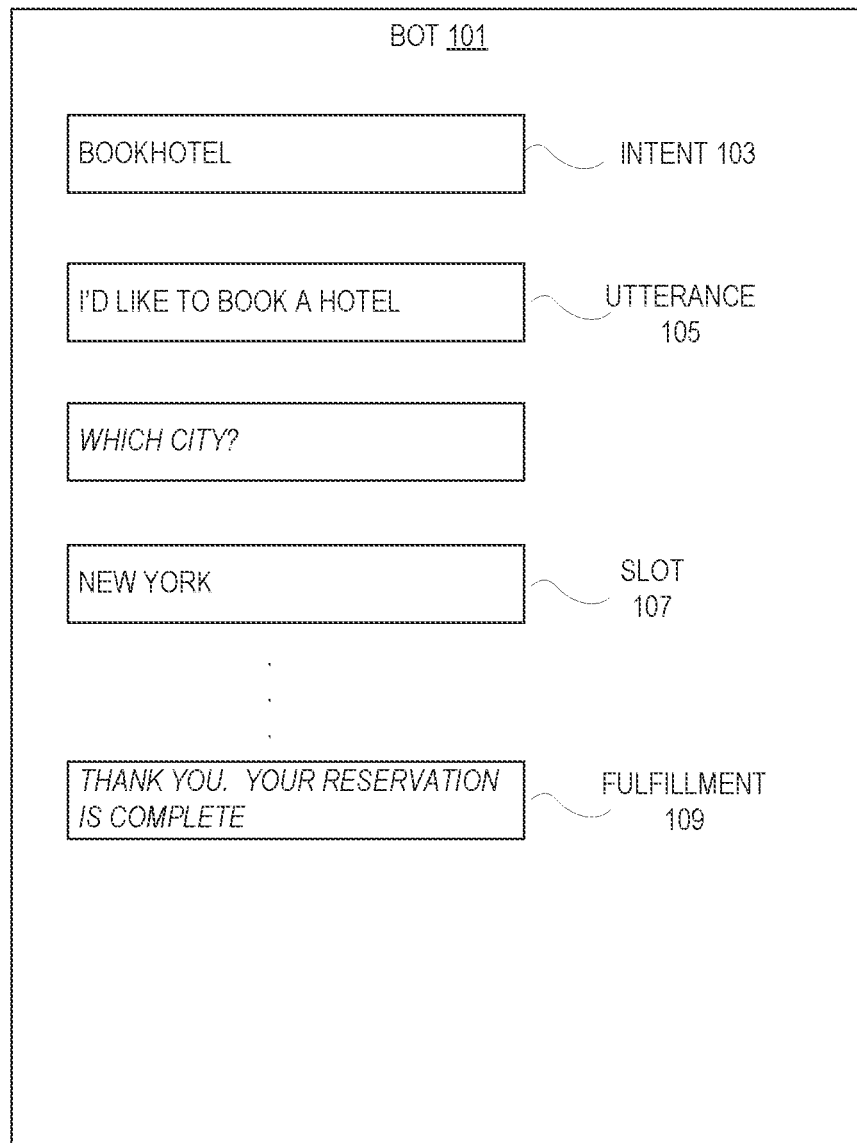
FIG. 1 illustrates an embodiment of a chatbot usage.

FIG. 1 illustrates an embodiment of a chatbot usage. In this example, the bot 101 is used to intake user input (such as utterances) and provide responses to the input (shown in italics). In this example, the intent 103 of the bot 101 is to book a hotel. An intent represents an action to take in response to natural language input. In particular, an intent is a task/goal for an agent (such as a chatbot) that is necessary in order to fulfill a user's request. Intents may use (1) custom slot types defined specifically for a domain (e.g., a "book_hotel" slot for a trip planning domain) or (2) built-in slot types that can express intents that are general enough to be applied across many domains (e.g., a "greeting" slot which can be applied to almost any domain). A slot is a list of values used to train a machine learning model to recognize values for a slot (e.g., the value "New York" in this example).

A user provides an utterance 105 in the form of a spoken or typed phrase that invokes the intent 103. Slots 107 are input data required to fulfill an intent. As such, slots 107 represent parameters that have to be asked and assigned values in order to fulfill an intent in a user's request. For example, in order to successfully complete a book_hotel reservation, an agent would require information about multiple slots such as, for example, the "start_date" and the "end_date" (which represent the check-in and check-out dates), the "location_to" (which represents the place where the user is traveling to) and other preferences of the user like "price_range." The list of possible values these slots 107 may be restricted to include (1) custom values (for the example dataset above, "location_to" can be the name of a US city such as, for example, San Jose, Seattle, etc.) or (2) built-in types, such as builtin.date for the slot labeled "start_date" or "end_date."

Finally, the bot 101 provides an indication of fulfillment.

At the start of the conversation, the bot expects a generic utterance during an intent elicitation phase to understand the intent of the user. These utterances may have a few domain specific words. Once the intent is detected, the bot enters into a slot elicitation mode to fill a specific slot value. Slot values typically contains a catalog of values such as names, medications, business names, etc.

For example, while responding to a bot prompt "How may I help you?", the user can say "I want to get tested for disease X" to express their intent during intent elicitation. These utterances contain domain specific terminology such as "disease X" that needs to be accurately transcribed, so that user's intent is appropriately detected. Based on the intent of the user, the bot can seek information on existing medication, symptoms and doctor names. Each information is captured in a slot and can span a finite list of value. During slot elicitation, the transcription needs to be focused on the acceptable list of values for the slot. As described in the example, users have specific words/phrases which are expected with a very high probability in the speech utterances at specific stages of the interaction. Once users provide these words/phrases, we are expected to also recognize those with a high probability based on the interaction state.

The actions that the chatbot may take are sometimes called dialog actions. In particular, a dialog action describes the next action that the bot should take in its interaction with the user and provides information about the context in which the action takes place. A dialog action may have several different components such as a name of an intent, a message to be shown to a user, a map of slots that have been gathered and their values, a slot to elicit, and an indication of a type of action to use such as: 1) confirm intent which is to ask the user if the intent is complete and ready to be fulfilled; 2) close which indicates that there is not response from a user; 3) delegate which means some entity other than the chatbot makes the decision as to the next action; 4) elicit intent wherein the next action is to determine the intent that the user wants to fulfill; and/or 5) elicit slot wherein the next action is to elicit a slot value from the user. In some embodiments, when using custom vocabularies, one or more of the following applies: the elicit intent dialog act intersects sample utterances for all intents and the custom vocabulary list, the elicit slot dialog act intersects slot values and the custom vocabulary list, and/or a confirm intent does not look at the custom vocabulary. As such, in some embodiments, the custom vocabulary is applied to the intent and/or slot level.

Figure 2:
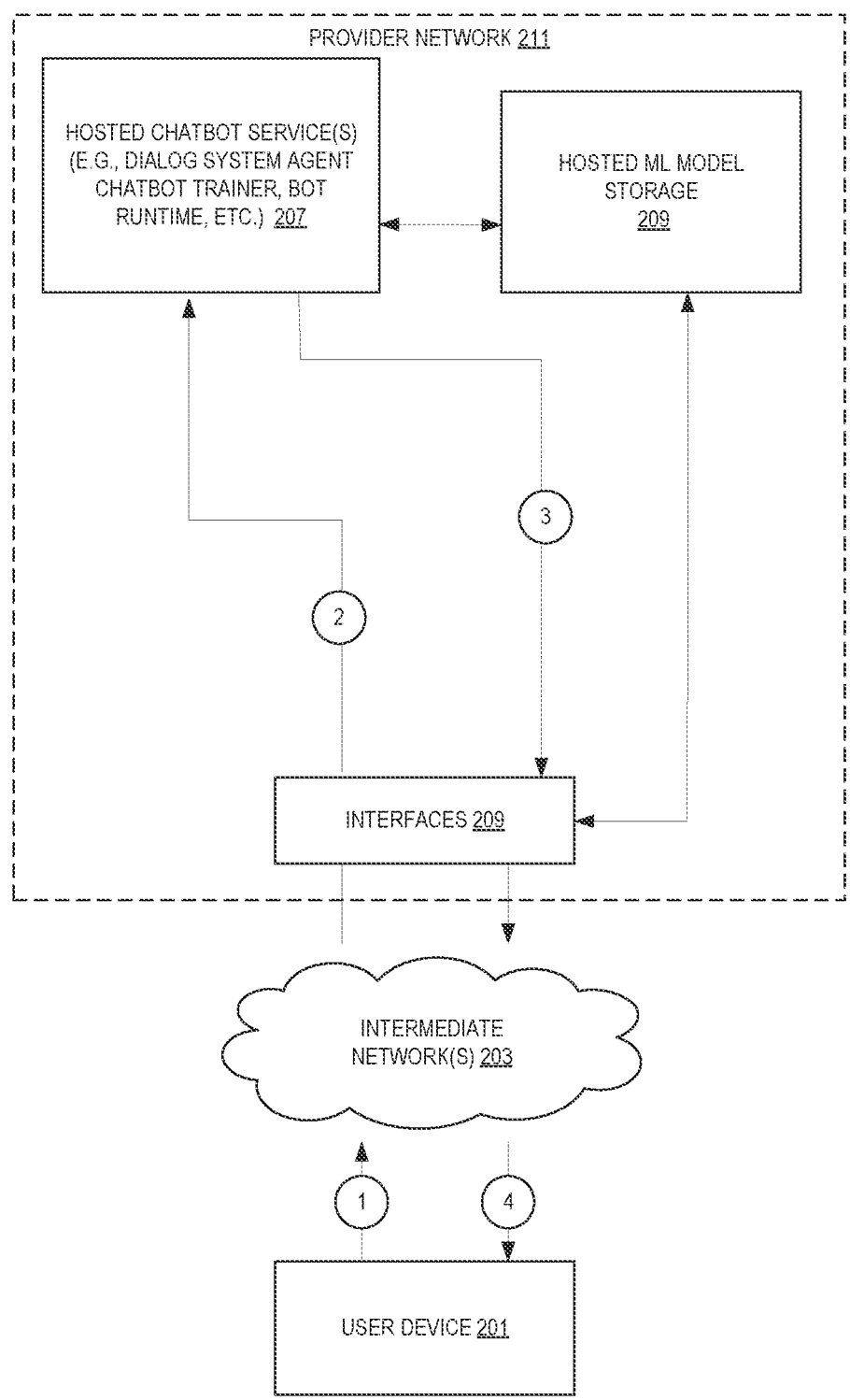
FIG. 2 illustrates embodiments of a system training a chatbot to use a custom vocabulary and and/or hosting a chatbot using ASR with a custom vocabulary.

FIG. 2 illustrates embodiments of a system training a chatbot to use a custom vocabulary and and/or hosting a chatbot using ASR with a custom vocabulary. As shown, a provider network 211 provides users with the ability to utilize one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. for at least NLU. These and other computing resources may be provided as services, such as a hardware virtualization service that can execute compute instances, a storage service that can store data objects, etc. The users (or "customers") of provider networks 211 may utilize one or more user accounts that are associated with a customer account, though these terms may be used somewhat interchangeably depending upon the context of use. User devices 201 may interact with a provider network 211 across one or more intermediate networks 203 (e.g., the internet) via one or more interface(s) 209, such as through use of application programming interface (API) calls, via a console implemented as a website or application, etc. The interface(s) 209 may be part of, or serve as a front-end to, a control plane of the provider network 211 that includes "backend" services supporting and enabling the services that may be more directly offered to customers.

A provider network 211 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 211 can use one or more user accounts that are associated with a customer account, though these terms can be used somewhat interchangeably depending upon the context of use. Users can interact with a provider network 211 across one or more intermediate networks 203 (e.g., the internet) via one or more interface(s) 209, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 209 can be part of, or serve as a front-end to, a control plane of the provider network 211 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 211 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

In this illustration, the provider network 211 provides several chatbot related services 207 including, for example, NLU services, ASR services (including support for custom vocabs), support for hosting a dialog system agent, dialog training data generation, machine learning (ML) model training (e.g., bot training), etc.

As shown, at circles 1 and 2, a user device 201 communicates with the provider network 211 via intermediate networks 203 and interfaces 209. In particular, the user device 201 communicates with a hosted ML service 207 (such as a bot including a dialog system agent). An example of a communication is an oral "utterance" to be handled by the bot. The hosted ML service 207 hosts ML models for different entities on a shared fleet of physical and/or virtual hosts. The hosted ML models may be custom (for example, user provided) or provided by the service. The bot may call other hosted ML services 207. Hosted ML model storage 209 stores models for NLU, ASR, support for hosting a dialog system agent, dialog training data generation, and ML model training.

The results of the interaction with the bot are returned at circle 3 and then forwarded back to the user device 201 as needed in circle 4.

Figure 3:
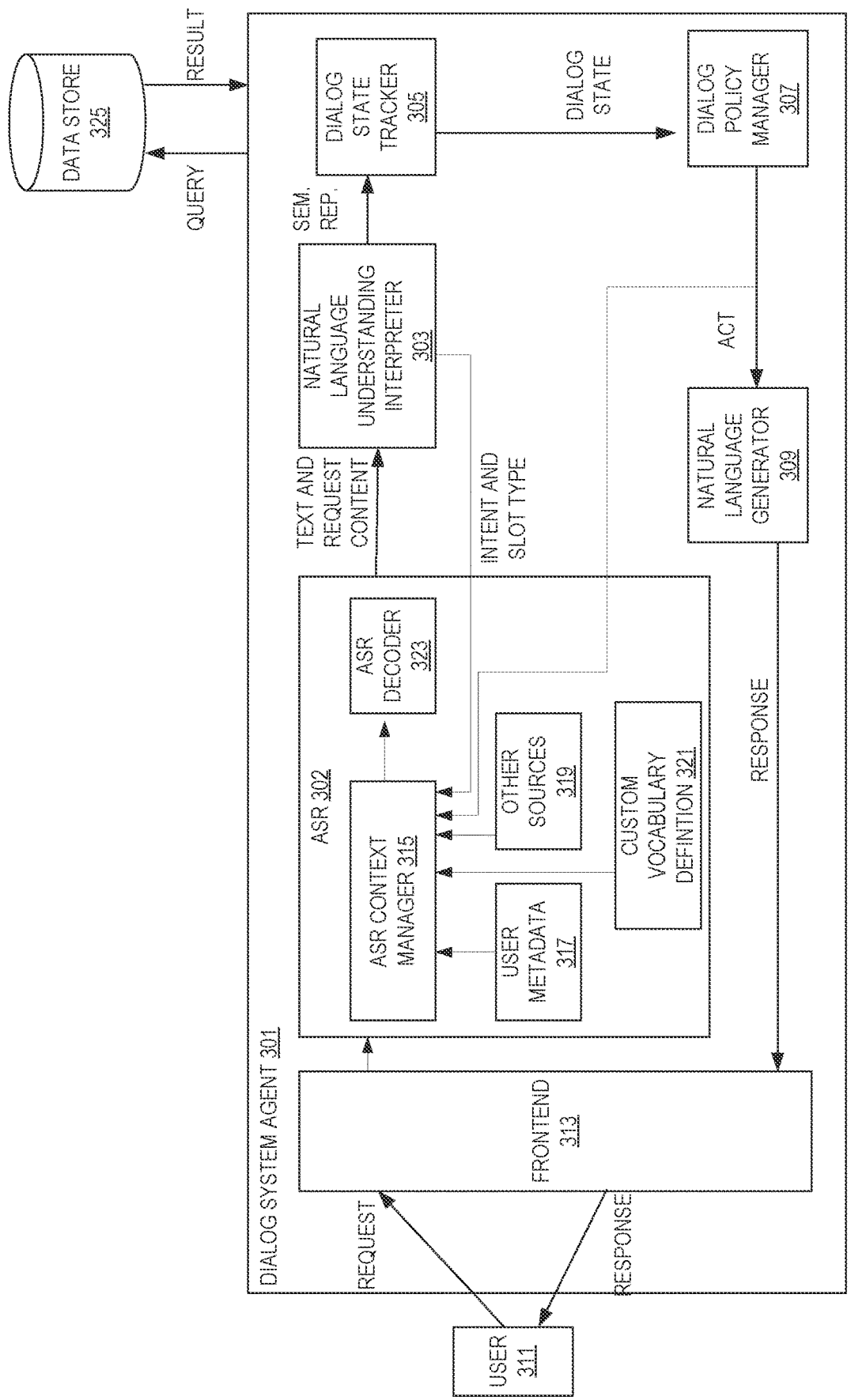
FIG. 3 illustrates embodiments of a dialog system agent.

FIG. 3 illustrates embodiments of a dialog system agent. In some embodiments, the dialog system agent is used to implement a chatbot. The dialog system agent 301 is typically a collection of software components stored in memory and executed by one or more processors. In some embodiments, one or more of the components are models and/or are a part of a larger model (such a rule based or machine learning).

As illustrated, the dialog system agent 301 includes many individual components, each responsible for performing a specific sub-task. A frontend or orchestrator 313 handles incoming requests and outgoing responses with a user 311. These requests may include audio and/or text from the user. Note that while components are shown as being connected (e.g., ASR 302 to Natural Language Understanding (NLU) interpreter 303) in some embodiments the frontend 313 coordinates the interactions and may pass the result of one component to the next component.

When the request includes audio, an ASR component 302 predicts text from the audio and passes the text and content of the request to the NLU interpreter 303. The ASR component 302 may include one or more sub-components. An ASR context manager 315 determines if a default artifact should be passed to an ASR decoder 323 to generate text or if a custom artifact (such as a weighted graph for example a weighted finite state transducer (wFST)) should be passed to the ASR decoder 323 to generate text. The ASR context manager 315 makes this determination based on one or more of user metadata (e.g., location, time, etc.), a custom vocabulary definition (scope and terms), dialog act (e.g., intent, slot type, and/or action type (e.g., confirm intent, elicit intent, or elicit slot) from the NLU interpreter 303, and/or other sources such as crawled websites, etc. In some embodiments, a artifacts index is also consulted. For example, for elicit intent the artifact in the artifacts index for "ElicitIntent" includes sample utterances and a custom vocabulary used in those utterances. As such, at runtime, a custom vocabulary artifact may be determined based on the dialog act or other contextual cues obtained from downstream components of a previous turn. With this approach, the bot builder can potentially control turn wise custom vocabulary list which can be dynamically swapped using personalized metadata as well, adding a high degree of flexibility. In addition to the custom vocabulary artifacts, in some embodiments, a small set of phrases are passed into the decoder 323 as context literals along with boosting parameters.

The NLU interpreter 303 maps a user's 311 utterance, provided image, or response text into a semantic representation. A Dialog State Tracker (DST) 305 updates its belief of the state of the system based on a history of the dialog (based on queries and results from the data store 325) and the semantic representation. A Dialog Policy Manager (DPM) 307 predicts the next action given the output of the DST 305. A Natural Language Generator (NLG) 309 converts the predicted action into text. In some instances, these components are typically trained independent of each other which may result in sub-optimal performance. However, in embodiments detailed herein, these components of the dialog system agent 301 are trained, end-to-end, together.

FIG. 4 illustrates an embodiment of a part of an exemplary bot definition and custom vocabulary definition. The bot definition 401 includes a plurality of intents (only two are shown) with each intent including one or more slots to fill in and their types, examples of slot prompts, and examples of utterances that signal the intent.

In some embodiments, each intent and its relationships are described as nodes in the intent graph. The intent graph is consumed by a conversation template generator which traverses the intent graph to generate a conversation template for each intent of the intent graph from which training data may be derived. A conversation template is a path through the graph. In some embodiments, the intent is traversed in a depth-first manner. Parameters dictating the actions of the conversation template generator such as, for example, intents to consider, a number of conversations to generate, a number of unique paths to generate, and transition probabilities, are provided in a request.

The custom vocabulary definition 403 allows for one or more parameters to be configured: a phrase (a word or phrase that should be recognized); pronunciation (the pronunciation of the phrase wherein the pronunciation is in a standard orthography or uses the International Phonetic Alphabet (IPA) (note that a single phrase can have multiple alternate pronunciations)); how to display an ASR transcription of the phrase (e.g., AWS as Amazon Web Services); and/or a weight (the degree to which the phrase recognition can be boosted or penalized).

In some embodiments, the custom vocabulary includes a scope (here global and a particular slot). In some embodiments, pre-processing of the definition removes some words that may degrade the accuracy of the artifacts. For example, the pre-processing may remove words that are individual characters (or short such as an, of, etc.) and/or how well the words are already represented in the bot definition and/or training data. Note that in some embodiments, the custom vocabulary definition 403 is a part of the bot definition.

Figure 5:
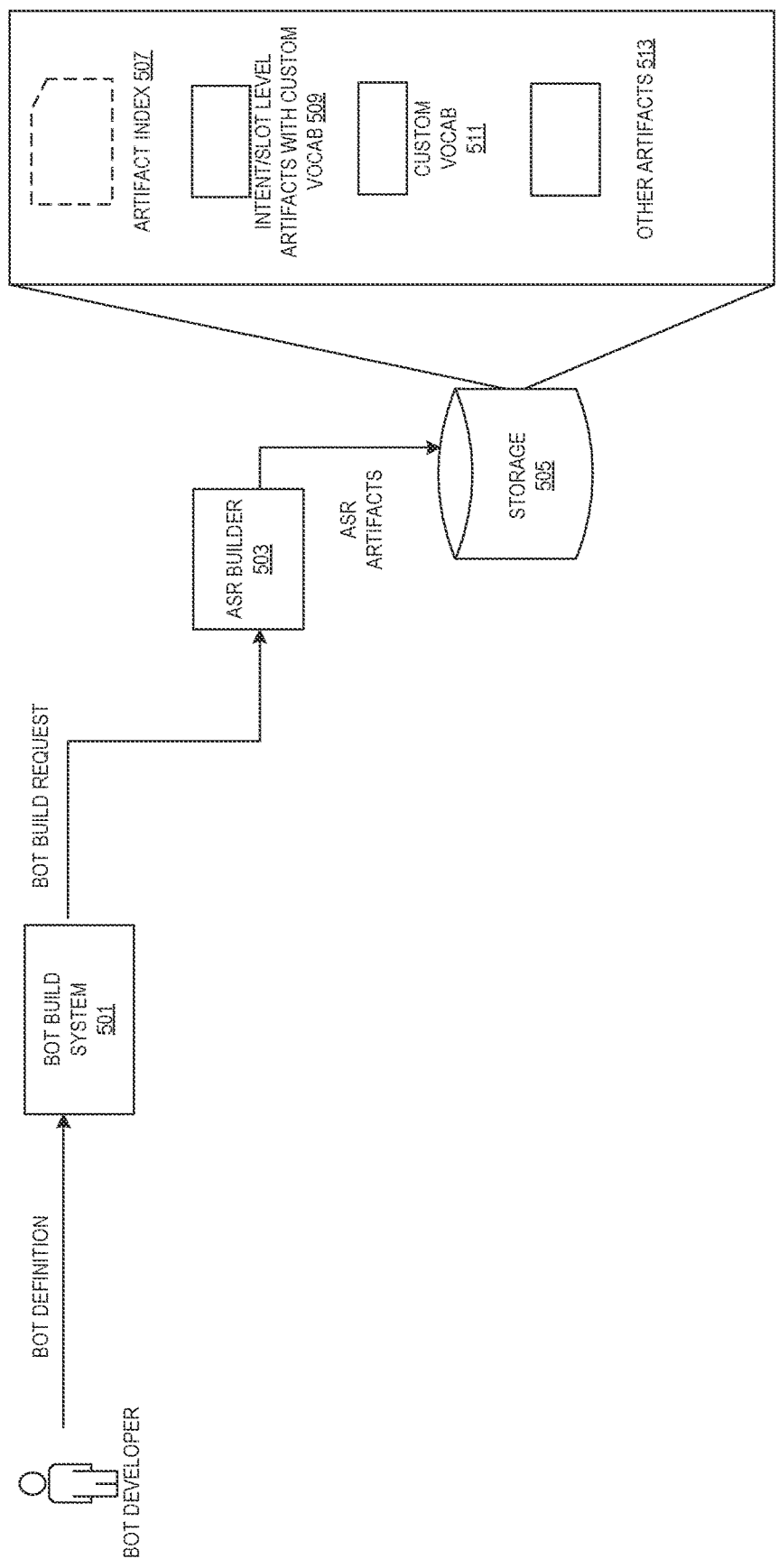
FIG. 5 illustrates embodiments of building artifacts that use a custom vocabulary.

FIG. 5 illustrates embodiments of building artifacts that use a custom vocabulary. A bot developer provides a bot definition to a bot build system 501. The bot definition includes one or more of intents, slots, sample utterances, slot values and custom vocab. In some embodiments, the bot definition is in a JavaScript Object Notation (JSON) format.

The bot build system 501 may be a hosted service of a provider network. The bot build system 501 is responsible for one or more acts to build a bot including, as a part of a bot build request, the calling for the building of ASR artifacts using ASR builder 503. Note the ASR builder 503 may also be provided service or a part of the bot build system 501.

The ASR builder 503 generates ASR artifacts including intent/slot level artifacts that use a custom vocabulary 509 and other artifacts 513 that do not use the custom vocabulary. An artifact index 507 is used in the redirection to/from the other artifacts 513 and the intent/slot level artifacts that use a custom vocabulary 509.

Storage 505 stores the intent/slot level artifacts that use a custom vocabulary 509, the other artifacts 513, the custom vocabulary 511, and the artifacts index 507.

Figure 6:
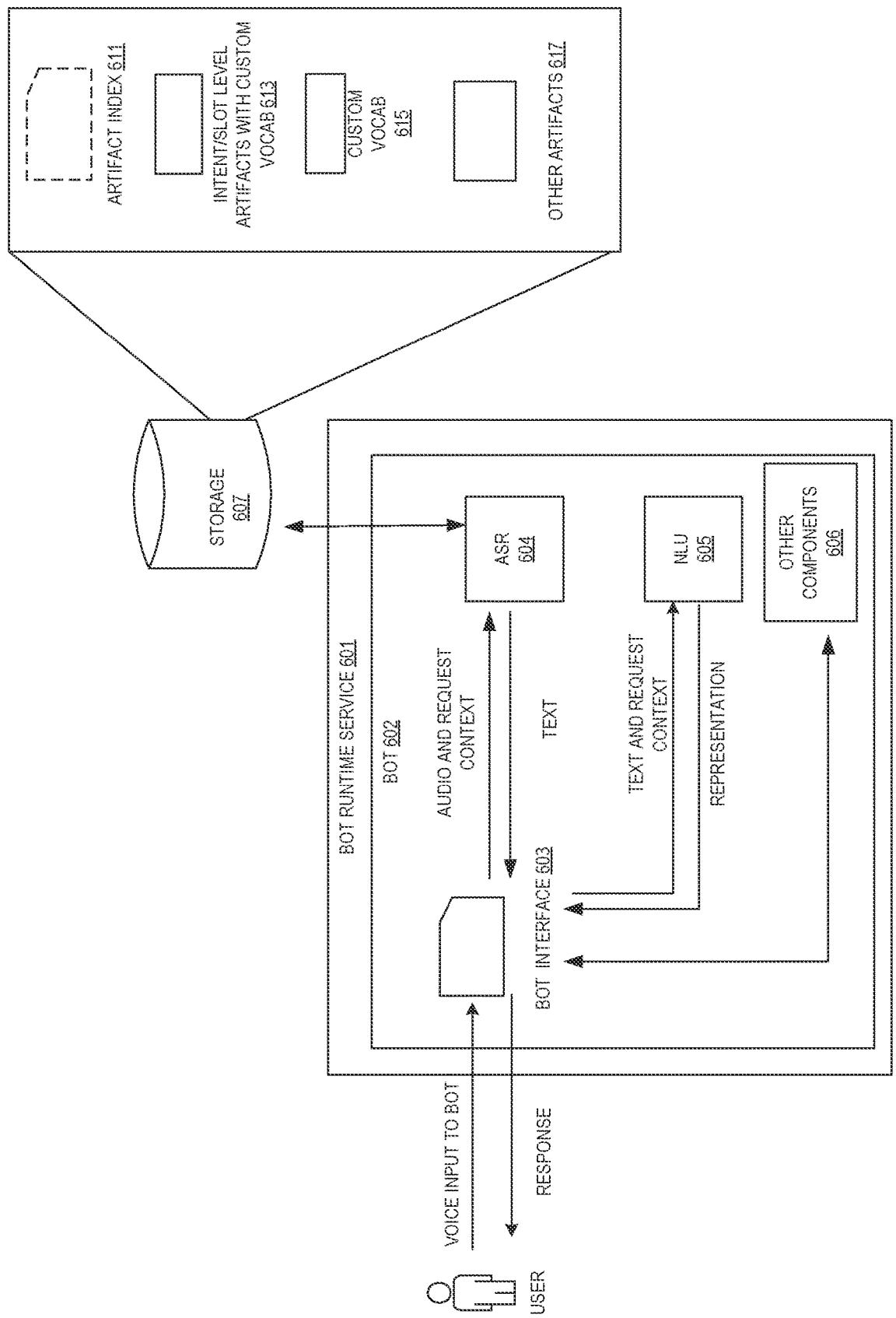
FIG. 6 illustrates embodiments of using artifacts that use a custom vocabulary in a chatbot scenario.

FIG. 6 illustrates embodiments of using artifacts that use a custom vocabulary in a chatbot scenario. In this illustration, a user is interacting with a bot interface 603 (e.g., frontend) of a bot 602 hosted by a bot runtime service 601.

The bot interface 603 takes in the voice input and provides that audio along with request context (dialog state information, user metadata (e.g., location and time), context literal hints (if used), other information, etc.) to the ASR component 604 which generates text. As shown the ASR component may need to access an artifacts index 611, intent/slot level artifacts that use a custom vocabulary 613, the other artifacts 617, and/or a custom vocabulary 615 from storage 607. In some embodiments, these are pre-loaded and thus not requiring a real-time access.

The text and the request context are then sent to a NLU 605 to generate a representation which is then passed to other components 606 as described with respect to FIG. 3 to generate a response to be provided to the user.

Figure 7:
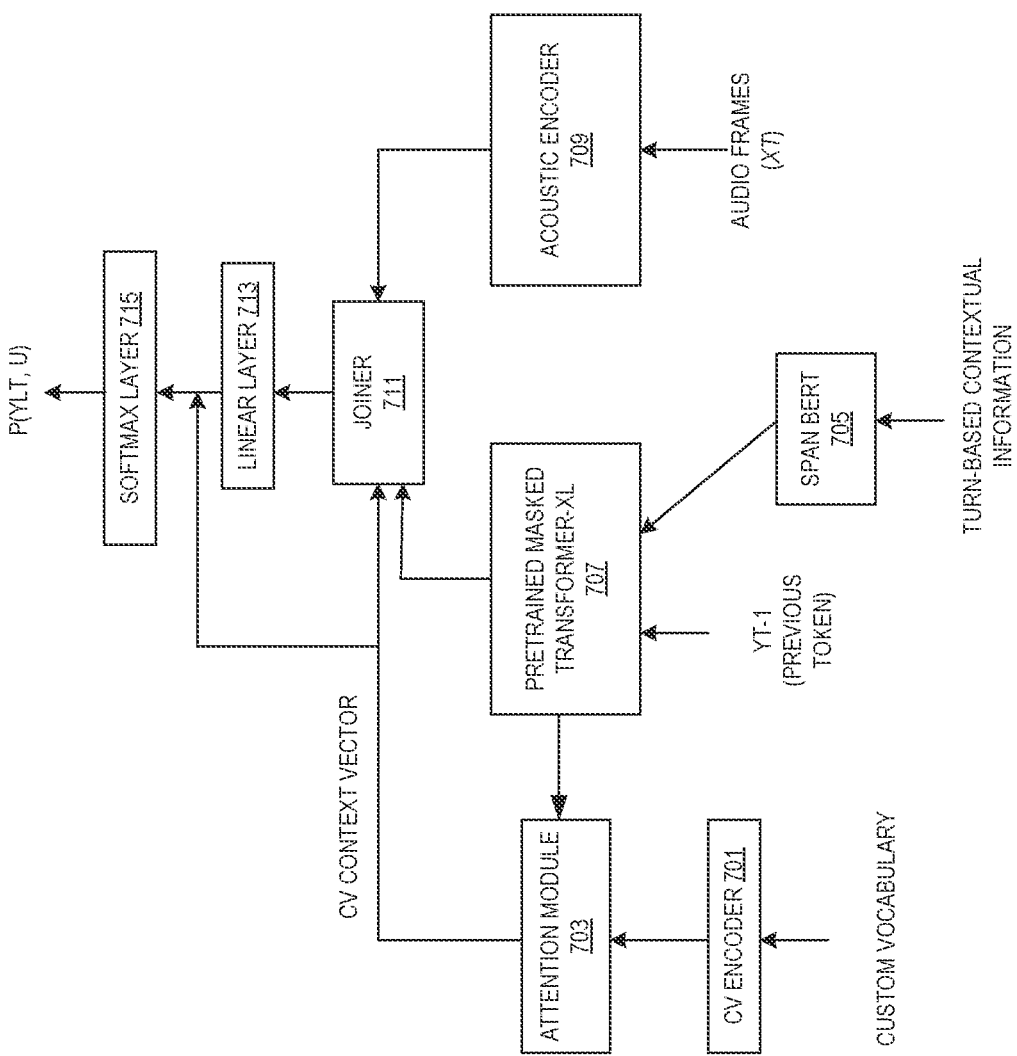
FIG. 7 illustrates a deep neural network-based ASR decoder to be used in a dialog system agent in some embodiments.

FIG. 7 illustrates a deep neural network-based ASR decoder to be used in a dialog system agent in some embodiments. In particular, this decoder is a context aware Transformer-Transducer (TT) model for optimizing custom vocabulary recognition in transcripts. In some embodiments this can be considered to be a variant of a recurrent neural network transducers (RNN-T) model wherein the predictor network side is altered.

This ASR decoder biases using an attention mechanism over a custom vocabulary list. In particular, a list of custom vocabulary (CV) is computed for each turn based on contextual information and represented as target sentence piece units. These units are then input to a CV encoder 701 (e.g., a self-attention-based encoder) to extract embeddings. The embeddings are fed to an attention module 703 to compute attention on the custom vocabulary embeddings. The attention module 703 uses an output of a predictor 707 (shown as pretrained masked transformer XL) as a query to compute attention weights. The resulting cv context vector is concatenated to predictor 707 and acoustic encoder 709 output before passing as an input to a joiner module 711 which feeds a linear layer 713. The cv context vector is concatenated to the input of final softmax layer 715 for additional biasing.

In some embodiments, the predictor 707 is pretrained in two stages. During the first stage, the model is pretrained on large amounts of text data. During the second stage, the model is pretrained with turn-based context provided as an additional input and optimized for language modeling task similar to a neural language model training. Then during RNN-T training, the initial layers of the pretrained masked Transformer-XL are frozen and finetuning is applied to only the top layers.

The turn-based context embeddings are extracted from turn-based contextual information using a Span-BERT 705. In some embodiments, these embeddings are also concatenated to previous non-blank output label (yt-1) and then passed through a projection layer before inputting to the predictor 707.

Figure 8:
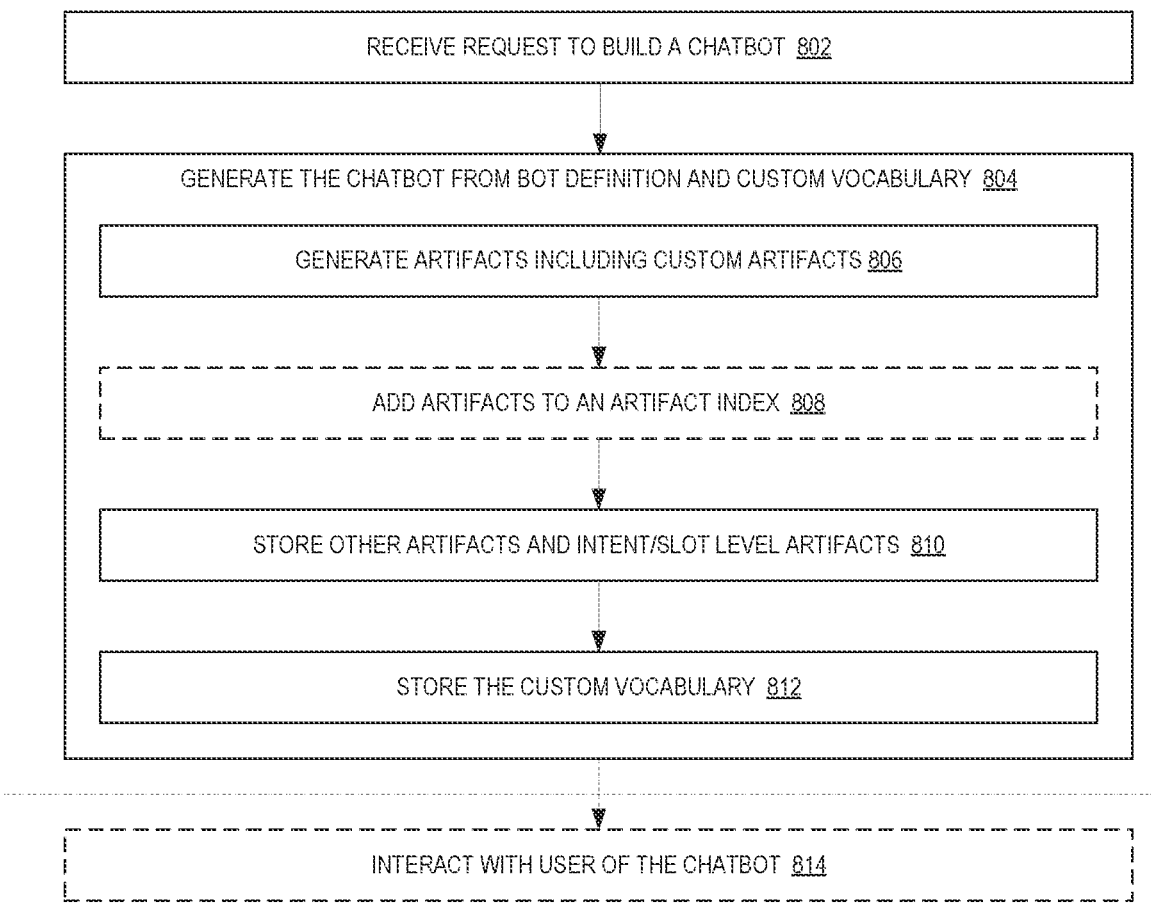
FIG. 8 is a flow diagram illustrating operations of a method for building and/or using a chatbot according to some embodiments.

FIG. 8 is a flow diagram illustrating operations of a method for building and/or using a chatbot according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by the dialog system agent and/or chatbot trainer of the other figures.

A request to build a chatbot using a custom vocabulary is received at 802. This request includes one or more of: a bot definition including a custom vocab, an indication of a location of a bot definition including a custom vocab, a bot definition without a custom vocabulary and a separate custom vocab, a location of a bot definition without a custom vocabulary and a separate custom vocab, a location of a bot definition without a custom vocabulary and a location of a separate custom vocab, a bot definition without a custom vocabulary and a location of a separate custom vocab, an indication of a language to use to interact, a name for the bot, an indication of a location to store the bot, an indication of a location to store artifacts, etc. This request may be in the form of input from one or more graphical user interfaces or input from one or more command line interfaces. Note that multiple requests may be used (e.g., a first to provide a custom vocabulary and a second to start chatbot generation).

The chatbot is generated from the bot definition and custom vocabulary at 804. The chatbot generation may include several sub-acts. This generation includes the generation of the components of the dialog system agent detailed earlier such as using an ASR builder to build artifacts. Some exemplary acts that may be performed include, but are not limited to the following. Note that acts that are not particularly germane to the use of custom vocabulary are not shown, but are performed.

At 806 artifacts are generated from the bot definition and custom vocabulary. For example, an ASR builder generates these artifacts. In some embodiments, the artifacts are weighted FSTs.

In some embodiments, the generated artifacts are added to an artifact index at 808.

The intent/slot level artifacts (which use the custom vocabulary) and the default (other) artifacts are stored at 810.

The custom vocabulary is stored at 812.

In some embodiments, a user interacts with the chatbot at 814.

In some embodiments, a user interacts with the chatbot at 814 including using the intent/slot level artifacts.

Figure 9:
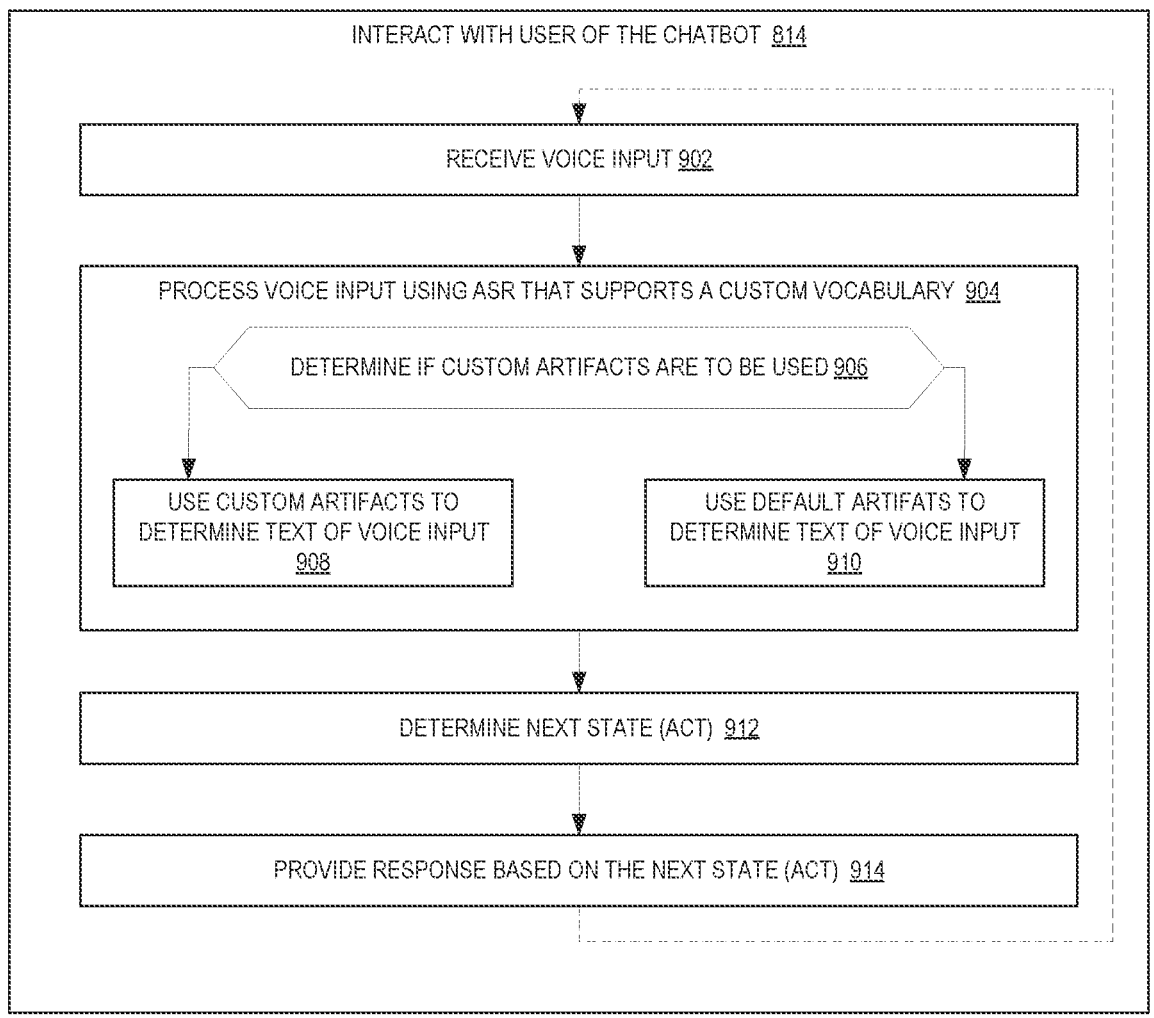
FIG. 9 is a flow diagram illustrating operations of a method for using a chatbot according to some embodiments.

FIG. 9 is a flow diagram illustrating operations of a method for using a chatbot according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by the dialog system agent of the other figures. In some embodiments, this flow illustrates act 814 of FIG. 8.

Audio voice input is received at 902. Note this may be solely audio or audio that is a part of a multimedia (e.g., video) input.

The voice input is processed using ASR that supports a custom vocabulary at 904. This processing may use artifacts that support the custom vocabulary or artifacts that do not based on a determination at 906. The determination is based on one or more factors such as user metadata, other data sources, the vocabulary definition, a previous turn's dialog state, etc.

When custom artifacts are to be used, they are used (as pointed to by an artifacts index) to generate text for the audio input at 908. When custom artifacts are to be used, a default artifact is used to generate text for the audio input at 910.

A next state is determined based at least part on the text at 912. This next state indicates what the chatbot is to do next and how to interact with the user. As such, a response to the input is provided at 914 based on the next state (act).

FIG. 10 illustrates embodiments of a graphical user interface for editing a custom vocabulary. As shown, the graphical user interface (GUI) allows a user to edit aspects of a bot including editing a custom vocabulary. As shown, the GUI may include a filter 1001 to search for a particular phrase, word, or vocabulary, a capability 1003 for the user to switch from a table view to a plain text view, a capability to add a phrase or word 1013, one or more fields to add, edit, or delete a word or phrase, and a means to save the changes to the custom vocabulary 1015.

When editing a word or phrase (such as deleting, editing, or adding), this GUI allows for a user to provide: a phrase or word using field 1005, one or more examples of what the phrase or word sounds like using field 1007, a pronunciation using field 1009, a display as for the phrase or word using field 1009, and/or a weight using field 1011. The user may also delete a word using the X. Note that one or more of these fields may be provided using one or more API calls or via a file such as a spreadsheet or comma separated value file.

Figure 11:
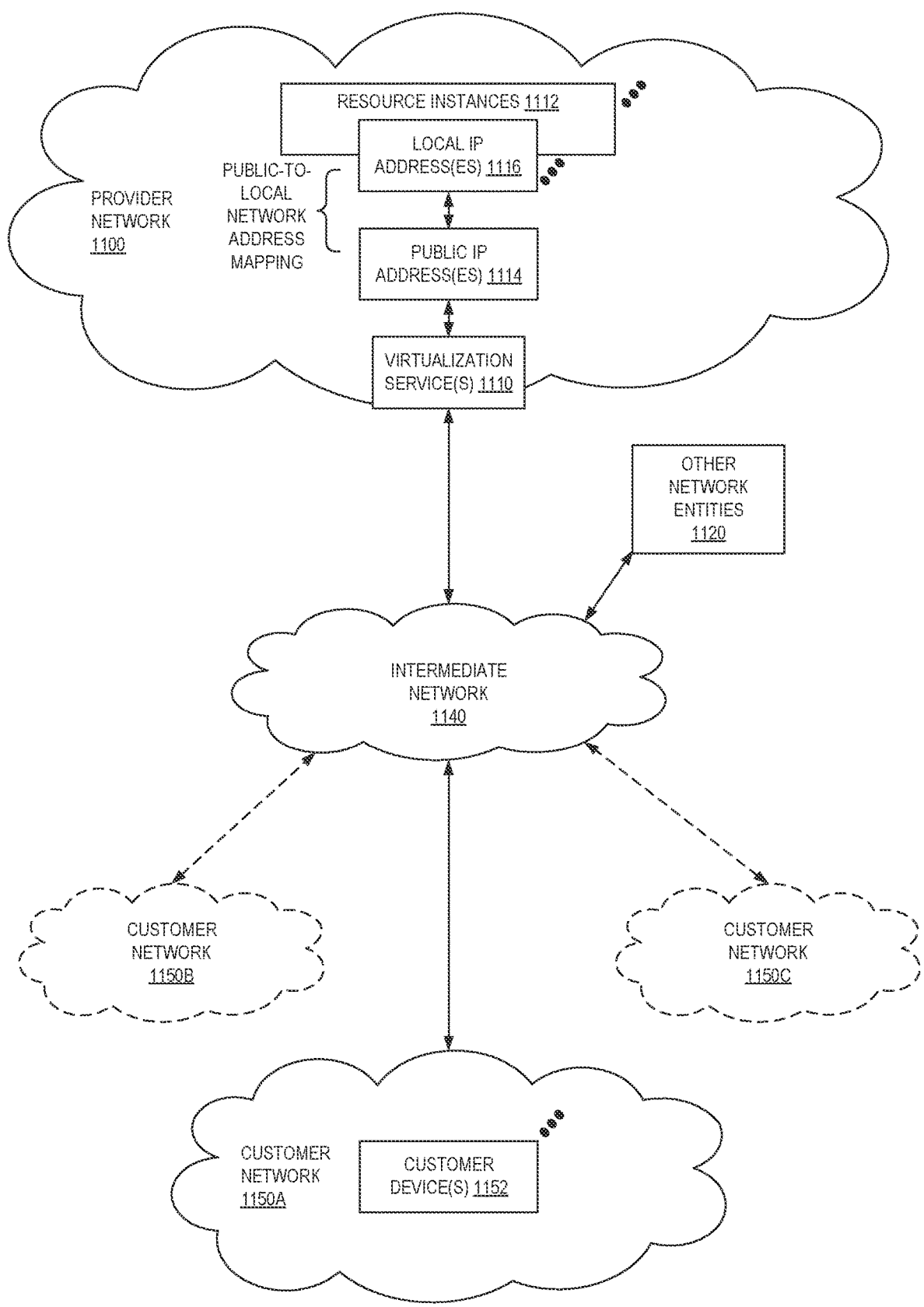
FIG. 11 illustrates an example provider network environment according to some embodiments.

FIG. 11 illustrates an example provider network (or "service provider system") environment according to some embodiments. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some embodiments, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
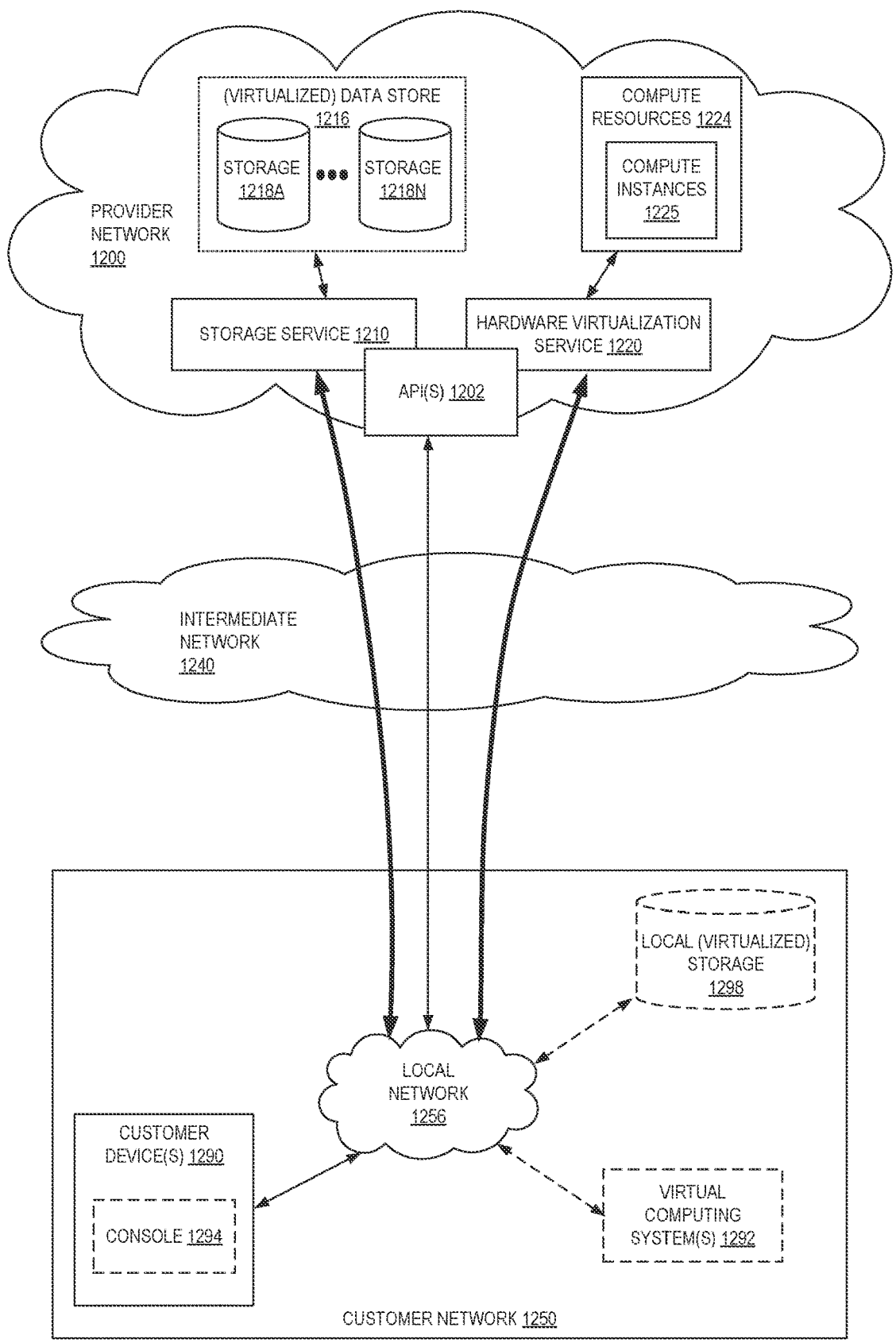
FIG. 12 is a block diagram of an example provider network that provides a storage service and a hardware virtualization service to customers according to some embodiments.

FIG. 12 is a block diagram of an example provider network environment that provides a storage service and a hardware virtualization service to customers, according to some embodiments. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some embodiments, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some embodiments, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some embodiments, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some embodiments, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
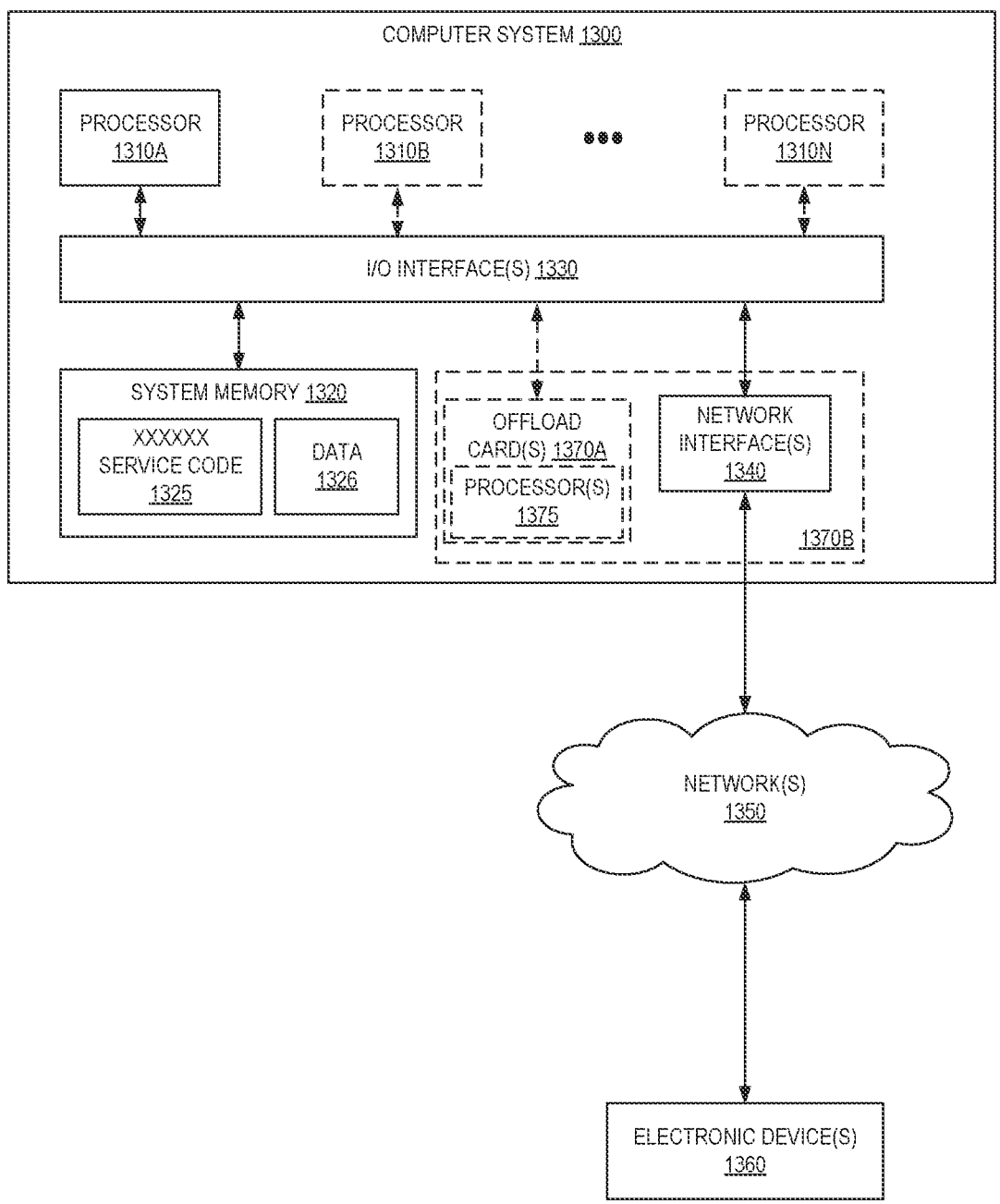
FIG. 13 is a block diagram illustrating an example computer system that can be used in some embodiments.

In some embodiments, a system that implements a portion or all of the techniques described herein can include a general-purpose computer system, such as the computer system 1300 illustrated in FIG. 13, that includes, or is configured to access, one or more computer-accessible media. In the illustrated embodiment, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various embodiments the computer system 1300 can include one computing device or any number of computing devices configured to work together as a single computer system 1300.

In various embodiments, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various embodiments, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various embodiments, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1320 as chatbot service code 1325 (e.g., executable to implement, in whole or in part, the chatbot service 207) and data 1326.

In some embodiments, the I/O interface 1330 can be configured to coordinate I/O traffic between the processor 1310, the system memory 1320, and any peripheral devices in the device, including the network interface 1340 and/or other peripheral interfaces (not shown). In some embodiments, the I/O interface 1330 can perform any necessary protocol, timing, or other data transformations to convert data signals from one component (e.g., the system memory 1320) into a format suitable for use by another component (e.g., the processor 1310). In some embodiments, the I/O interface 1330 can include support for devices attached through various types of peripheral buses, such as a variant of the Peripheral Component Interconnect (PCI) bus standard or the Universal Serial Bus (USB) standard, for example. In some embodiments, the function of the I/O interface 1330 can be split into two or more separate components, such as a north bridge and a south bridge, for example. Also, in some embodiments, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 1, for example. In various embodiments, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some embodiments the offload card(s) 1370A or 1370B can perform compute instance management operations, such as pausing and/or un-pausing compute instances, launching and/or terminating compute instances, performing memory transfer/copying operations, etc. These management operations can, in some embodiments, be performed by the offload card(s) 1370A or 1370B in coordination with a hypervisor (e.g., upon a request from a hypervisor) that is executed by the other processors 1310A-1310N of the computer system 1300. However, in some embodiments the virtualization manager implemented by the offload card(s) 1370A or 1370B can accommodate requests from other entities (e.g., from compute instances themselves), and cannot coordinate with (or service) any separate hypervisor.

In some embodiments, the system memory 1320 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
    receiving a request to build a chatbot using a bot definition and a custom vocabulary, wherein the chatbot is to use runtime hints during usage, and wherein the request to build a chatbot includes at least one of the bot definition and the custom vocabulary, an indication of a location of the bot definition and the custom vocabulary, the bot definition without the custom vocabulary and a separate custom vocabulary, a location of the bot definition without the custom vocabulary and a separate custom vocabulary, a location of the bot definition without the custom vocabulary and a location of a separate custom vocabulary, the bot definition without the custom vocabulary and a location of a separate custom vocabulary, an indication of a language to use to interact, a name for the chatbot, an indication of a location to store the chatbot, and an indication of a location to store artifacts;
    building the chatbot from the bot definition and the custom vocabulary by at least:
        generating automatic speech recognition (ASR) artifacts to be used in decoding audio input into the chatbot, the ASR artifacts including a first type of artifacts that use the custom vocabulary and a second type of artifacts that do not use the custom vocabulary,
        adding the ASR artifacts into an artifacts index, and storing the ASR artifacts; and
    interacting with a user using received audio, wherein text for the received audio is predicted using the generated ASR artifacts and which type of artifacts to use is dynamically determined per turn of the interacting.

2. The computer-implemented method of claim 1, wherein the bot definition defines a language to use, an intent, a slot, and a slot type.

3. A computer-implemented method comprising:
    receiving a request to build a chatbot using a bot definition and a custom vocabulary, wherein the chatbot is to use runtime hints during usage;
    building the chatbot from the bot definition and the custom vocabulary by at least:
        generating automatic speech recognition (ASR) artifacts to be used in decoding audio input into the chatbot into text for at least one other component of the chatbot to use in determining a next act to be performed, the ASR artifacts including artifacts that use the custom vocabulary and artifacts that do not use the custom vocabulary, and
        storing the ASR artifacts;
    receiving audio by interacting with a user using the chatbot;
    dynamically determining to use, for the audio, the ASR artifacts that use the custom vocabulary by evaluating one or more inputs, including at least one of the custom vocabulary, a previous state of the chatbot, and user metadata; and
    generating text from the audio using the ASR artifacts that use the custom vocabulary.

4. The computer-implemented method of claim 3, wherein the ASR artifacts comprise one or more weighted graphs.

5. The computer-implemented method of claim 3, wherein the bot definition defines a language to use, an intent, a slot, and a slot type.

6. The computer-implemented method of claim 3, wherein the custom vocabulary defines a global custom vocabulary of weighted words to use for a particular intent and slot combination.

7. The computer-implemented method of claim 3, wherein at least a natural language understanding aspect of the chatbot provides aspects of the previous state of the chatbot including an intent and a slot type.

8. The computer-implemented method of claim 3, wherein interacting with the user using the chatbot comprises:
    dynamically determining to use ASR artifacts that do not use the custom vocabulary; and
    using the ASR artifacts that do not use the custom vocabulary to generate text from the audio.

9. The computer-implemented method of claim 3, wherein the decoding is performed by a deep neural network decoder.

10. The computer-implemented method of claim 3, wherein the request to build a chatbot includes at least one of the bot definition and the custom vocabulary, an indication of a location of the bot definition including the custom vocabulary, the bot definition without the custom vocabulary and a separate custom vocabulary, a location of the bot definition without the custom vocabulary and a separate custom vocabulary, a location of the bot definition without the custom vocabulary and a location of a separate custom vocabulary, the bot definition without the custom vocabulary and a location of a separate custom vocabulary, an indication of a language to use to interact, a name for the chatbot, an indication of a location to store the chatbot, or an indication of a location to store artifacts.

11. The computer-implemented method of claim 3, further comprising adding the ASR artifacts into an artifacts index.

12. A system comprising:
    a first one or more electronic devices to implement a chatbot service in a multi-tenant provider network; and
    a second one or more electronic devices to implement a chatbot generation service in the multi-tenant provider network, the chatbot generation service including instructions that upon execution cause the chatbot generation service to:
        receive a request to build a chatbot for the chatbot service using a bot definition and a custom vocabulary, wherein the chatbot is to use runtime hints during usage;
        build the chatbot from the bot definition and the custom vocabulary by at least:

generating automatic speech recognition (ASR) artifacts to be used in decoding audio input into the chatbot into text for at least one other component of the chatbot to use in determining a next act to be performed, the ASR artifacts including artifacts that use the custom vocabulary and artifacts that do not use the custom vocabulary, and storing the ASR artifacts;

receive audio by interacting with a user using the chatbot;

dynamically determine to use, for the audio, the ASR artifacts that use the custom vocabulary by evaluating one or more inputs, including at least one of the custom vocabulary, a previous state of the chatbot, and user metadata; and generate text from the audio using the ASR artifacts that use the custom vocabulary.

13. The system of claim 12, wherein the ASR artifacts comprise one or more weighted graphs.

14. The system of claim 12, wherein the bot definition defines a language to use, an intent, a slot, and a slot type.

15. The system of claim 12, wherein the custom vocabulary defines a global custom vocabulary of weighted words to use for a particular intent and slot combination.

16. The system of claim 12, wherein the request to build a chatbot includes at least one of the bot definition including the custom vocabulary, an indication of a location of the bot definition including the custom vocabulary, the bot definition without the custom vocabulary and a separate custom vocabulary, a location of the bot definition without the custom vocabulary and a separate custom vocabulary, a location of the bot definition without the custom vocabulary and a location of a separate custom vocabulary, the bot definition without the custom vocabulary and a location of a separate custom vocabulary, an indication of a language to use to interact, a name for the chatbot, an indication of a location to store the chatbot, or an indication of a location to store artifacts.

17. The system of claim 12, wherein the chatbot generation service is further to store the ASR artifacts into an artifacts index.

18. The system of claim 12, wherein at least a natural language understanding aspect of the chatbot provides aspects of the previous state of the chatbot including an intent and a slot type.

19. The system of claim 12, wherein interacting with the user using the chatbot comprises:

dynamically determining to use ASR artifacts that do not use the custom vocabulary; and using the ASR artifacts that do not use the custom vocabulary to generate text from the audio.

20. The system of claim 12, wherein the decoding is performed by a deep neural network decoder.

* * * * *